US012652488B2

(12) United States Patent
Koschak et al.

(10) Patent No.: US 12,652,488 B2
(45) Date of Patent: Jun. 9, 2026

(54) AMBISONIC MICROPHONE

(71) Applicant: Shure Acquisition Holdings, Inc., Niles, IL (US)

(72) Inventors: Matthew Koschak, Deerfield, IL (US); William Wallace Taylor, III, Buffalo Grove, IL (US); Joseph Michael Bradel, South Beloit, IL (US); Brent Robert Shumard, Mount Prospect, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 153 days.

(21) Appl. No.: 18/644,251

(22) Filed: Apr. 24, 2024

(65) Prior Publication Data

US 2024/0365057 A1 Oct. 31, 2024

Related U.S. Application Data

(60) Provisional application No. 63/576,446, filed on Apr. 28, 2023.

(51) Int. Cl.

| | |
|---|---|
| ***H04R 1/40*** | (2006.01) |
| ***H04R 1/08*** | (2006.01) |
| ***H04R 3/00*** | (2006.01) |

(52) U.S. Cl.

CPC ............... *H04R 1/406* (2013.01); *H04R 1/08* (2013.01); *H04R 3/005* (2013.01); (Continued)

(58) Field of Classification Search

CPC .. H04R 1/406; H04R 5/027; H04R 2201/401; H04S 3/008; H04S 2400/15; H04S 2420/11

See application file for complete search history.

(56) References Cited

U.S. PATENT DOCUMENTS

| | | | |
|---|---|---|---|
| 4,042,779 | A | 8/1977 | Craven et al. |
| 7,333,622 | B2 | 2/2008 | Algazi et al. |

(Continued)

FOREIGN PATENT DOCUMENTS

| | | | |
|---|---|---|---|
| CN | 203840493 | U | 9/2014 |
| CN | 206117920 | U | 4/2017 |

(Continued)

OTHER PUBLICATIONS

Lewis Mcgregor, premiumbeat.com, 5 Ambisonic Microphone Options for your next Big Project, retrieved from https://www.premiumbeat.com/blog/best-ambisonic-microphones/, Jun. 23, 2022.

(Continued)

*Primary Examiner* — Kile O Blair

(74) *Attorney, Agent, or Firm* — Banner & Witcoff, Ltd.

(57) ABSTRACT

Methods and apparatuses for capturing and encoding ambisonic audio are described herein. An example ambisonic microphone may comprise a first microphone capsule oriented substantially toward a first vertex of a notional tetrahedron, a second microphone capsule oriented substantially toward a second vertex of the notional tetrahedron, a third microphone capsule oriented substantially toward a third vertex of the notional tetrahedron, and a fourth microphone capsule oriented substantially toward a fourth vertex of the notional tetrahedron.

20 Claims, 10 Drawing Sheets

(52) U.S. Cl.
CPC .... *H04R 2201/401* (2013.01); *H04R 2430/20* (2013.01); *H04R 2499/11* (2013.01)

(56) References Cited

U.S. PATENT DOCUMENTS

| | | | |
|---|---|---|---|
| 8,170,260 | B2 | 5/2012 | Reining et al. |
| 8,284,952 | B2 | 10/2012 | Reining et al. |
| 8,340,315 | B2 | 12/2012 | Kantola |
| 8,406,436 | B2 | 3/2013 | Craven et al. |
| 9,294,838 | B2 | 3/2016 | Christoph |
| 9,654,893 | B2 | 5/2017 | Estrada et al. |
| 9,826,304 | B2 | 11/2017 | Akino |
| 10,390,118 | B2 | 8/2019 | Sano |
| 10,469,968 | B2 | 11/2019 | Peters et al. |
| 10,694,167 | B1 | 6/2020 | Van Hoff et al. |
| 10,714,098 | B2 | 7/2020 | Huang et al. |
| 10,785,563 | B1 | 9/2020 | Kawata |
| 10,820,097 | B2 | 10/2020 | Tsingos et al. |
| 10,924,855 | B2 | 2/2021 | Kudoh |
| 11,032,640 | B2 | 6/2021 | Usher |
| 11,115,739 | B2 | 9/2021 | Vilermo et al. |
| 11,284,203 | B2 | 3/2022 | Williamson et al. |
| 11,388,510 | B2 | 7/2022 | Craven et al. |
| 11,388,512 | B2 | 7/2022 | Solvang |
| 12,028,678 | B2 | 7/2024 | Shumard et al. |
| 2007/0009116 | A1 | 1/2007 | Reining |
| 2008/0219485 | A1 | 9/2008 | Kantola |
| 2009/0190776 | A1 | 7/2009 | Reining |
| 2009/0190777 | A1 | 7/2009 | Reining |
| 2009/0214053 | A1 | 8/2009 | Reining |
| 2009/0268925 | A1 | 10/2009 | Reining |
| 2019/0200156 | A1 | 6/2019 | Zhang et al. |
| 2020/0296506 | A1 | 9/2020 | Kawata |
| 2021/0099809 | A1 | 4/2021 | Williamson et al. |
| 2021/0136487 | A1 | 5/2021 | Shumard et al. |
| 2022/0264075 | A1* | 8/2022 | Blase .................. H04N 13/282 |
| 2023/0292072 | A1 | 9/2023 | Mitsui et al. |

FOREIGN PATENT DOCUMENTS

| | | | |
|---|---|---|---|
| CN | 208158813 | U | 11/2018 |
| EP | 1737271 | A1 | 12/2006 |
| EP | 4124056 | A1 | 1/2023 |
| GB | 2575492 | A | 1/2020 |
| WO | 2022108494 | A1 | 5/2022 |

OTHER PUBLICATIONS

Rode.com, "NT-SF1 Ambisonic Microphones," retrieved from https://rode.com/en/microphones/360-ambisonic.

Reddit.com, "Mounting a 360 Camera with an Ambisonic Microphone," retrieved from https://www.reddit.com/r/360Cameras/comments/f2kg1k/mounting_a_360_camera_with_an_ambisonic_microphone/.

360rumors.com, "You can now preorder the Zoom H3-VR ambisonic microphone with auto alignment and other advanced features," retrieved from https://360rumors.com/can-now-preorder-zoom-h3-vr-ambisonic-microphone-auto-alignment-advanced-features/, Sep. 13, 2018.

Spatial Mic Voyage Audio, 360 Ambisonic Microphone retrieved from https://voyage.audio/spatialmic/?gclid=EAlalQobChMImebexNuc-glVDKblCh18lw1bEAMYASAAEgLL0fD_BwE.

MiniDSP.com, "USB Ambisonic Microphone ambiMIK-1," retrieved from https://www.minidsp.com/products/acoustic-measurement/ambimik-1.

Sep. 4, 2024—(WO) International Search Report and Written Opinion—App PCT/US2024/026424.

Nov. 21, 2025—(WO) International Search Report and Written Opinion—App PCT/US2025/044864.

* cited by examiner

AMBISONIC MICROPHONE

CROSS-REFERENCE TO RELATED APPLICATION

This application claims priority to U.S. Provisional Patent Application No. 63/576,446, filed on Apr. 28, 2023, which is hereby incorporated by reference in its entirety.

FIELD

Aspects described herein generally relate to an ambisonic microphone, and/or hardware and/or software related thereto. More specifically, one or more aspects described herein provide for an array of microphone capsules for capturing ambisonic audio.

BACKGROUND

Ambisonic audio may refer to a form of full-sphere periphony that may be used in many virtual reality and/or other immersive applications. Ambisonic audio may be encoded according to Ambisonics B-Format, where four A-format signals from four microphone capsules of an ambisonic microphone are encoded into four separate channels labeled W, X, Y, and Z. The W channel corresponds to the mono output from an omnidirectional microphone while the X, Y, and Z channels correspond to directional components of the sound signal. With the rising popularity of various services and applications utilizing ambisonic audio, there is an increasing demand for improvements in ambisonic microphones that can be achieved with relatively simple processes and with relatively low-cost equipment.

SUMMARY

The following presents a simplified summary of the disclosure in order to provide a basic understanding of some aspects of the disclosure. This summary is not an extensive overview of the disclosure. It is not intended to identify key or critical elements of the invention or to delineate the scope of the invention. The following summary merely presents some concepts of the disclosure in a simplified form as a prelude to the more detailed description provided below.

Capturing ambisonic audio often requires extensive capital, cabling, external companion equipment, and advanced knowledge of A-format to B-format conversion techniques to attain a high-quality ambisonic audio signal. Additionally, the increasing accessibility and portability of equipment, such as used for podcasting, live streaming, and/or other recording, may allow a user to perform in various acoustic environments. However, depending on the application, a user might not have sufficient time, knowledge, and/or equipment to properly capture ambisonic audio to attain a desired audio quality.

As described in more detail herein, this application sets forth apparatuses, and methods for capturing ambisonic audio with an array architecture of microphone capsules with stable high frequency polar consistency and reduced acoustic shading. These apparatuses, and methods may be helpful in enabling a consumer to quickly and easily capture high-quality ambisonic audio, convert the ambisonic audio to a desired format, and/or utilize the ambisonic audio in one or more of a number of applications, such as immersive musical recordings, surround sound encoding, podcasting, video game audio design, stereoscopically tracked virtual reality/augmented reality experiences, and multichannel mixing, and/or one or more other applications.

An example ambisonic microphone may comprise a plurality of microphone capsules geometrically arranged to reduce an acoustic shading effect from a structural interference and compactly nested to reduce a phase-related error. The plurality of microphone capsules may comprise a first microphone capsule oriented substantially toward a first vertex of a notional tetrahedron, a second microphone capsule oriented toward a second vertex of a notional tetrahedron, a third microphone capsule oriented substantially toward a third vertex of the notional tetrahedron, and a fourth microphone capsule oriented substantially toward a fourth vertex of the notional tetrahedron An example method may comprise arranging a first microphone capsule on a first face of a notional tetrahedron and orienting a first face of the first microphone capsule substantially orthogonally to the first face of the notional tetrahedron. The method may further comprise arranging a second microphone capsule on a second face of the notional tetrahedron, orienting a second face of the second microphone capsule substantially orthogonally to the second face of the notional tetrahedron, and nesting the first microphone capsule with the second microphone capsule such that a first axis of minimum sensitivity of the first microphone capsule and a second axis of minimum sensitivity of the second microphone capsule intersect at a first coincident point.

These as well as other novel advantages, details, examples, features and objects of the present disclosure will be apparent to those skilled in the art from following the detailed description, the attached claims and accompanying drawings, listed herein, which are useful in explaining the concepts discussed herein.

BRIEF DESCRIPTION OF THE DRAWINGS

Some features are shown by way of example, and not by limitation, in the accompanying drawings. In the drawings, like numerals reference similar elements.

DETAILED DESCRIPTION

In the following description of the various examples, reference is made to the accompanying drawings, which form a part hereof, and in which is shown by way of illustration various examples in which aspects may be practiced. References to "embodiment," "example," and the like indicate that the embodiment(s) or example(s) of the invention so described may include particular features, structures, or characteristics, but not every embodiment or example necessarily includes the particular features, structures, or characteristics. Further, it is contemplated that certain embodiments or examples may have some, all, or none of the features described for other examples. And it is to be understood that other embodiments and examples may be utilized and structural and functional modifications may be made without departing from the scope of the present disclosure.

Unless otherwise specified, the use of the serial adjectives, such as, "first," "second," "third," and the like that are used to describe components, are used only to indicate different components, which can be similar components. But the use of such serial adjectives is not intended to imply that the components must be provided in given order, either temporally, spatially, in ranking, or in any other way.

Also, while the terms "front," "back," "side," and the like may be used in this specification to describe various example features and elements, these terms are used herein as a matter of convenience, for example, based on the example orientations shown in the figures and/or the orientations in typical use. Nothing in this specification should be construed as requiring a specific three dimensional or spatial orientation of structures in order to fall within the scope of the claims.

Figure 1:
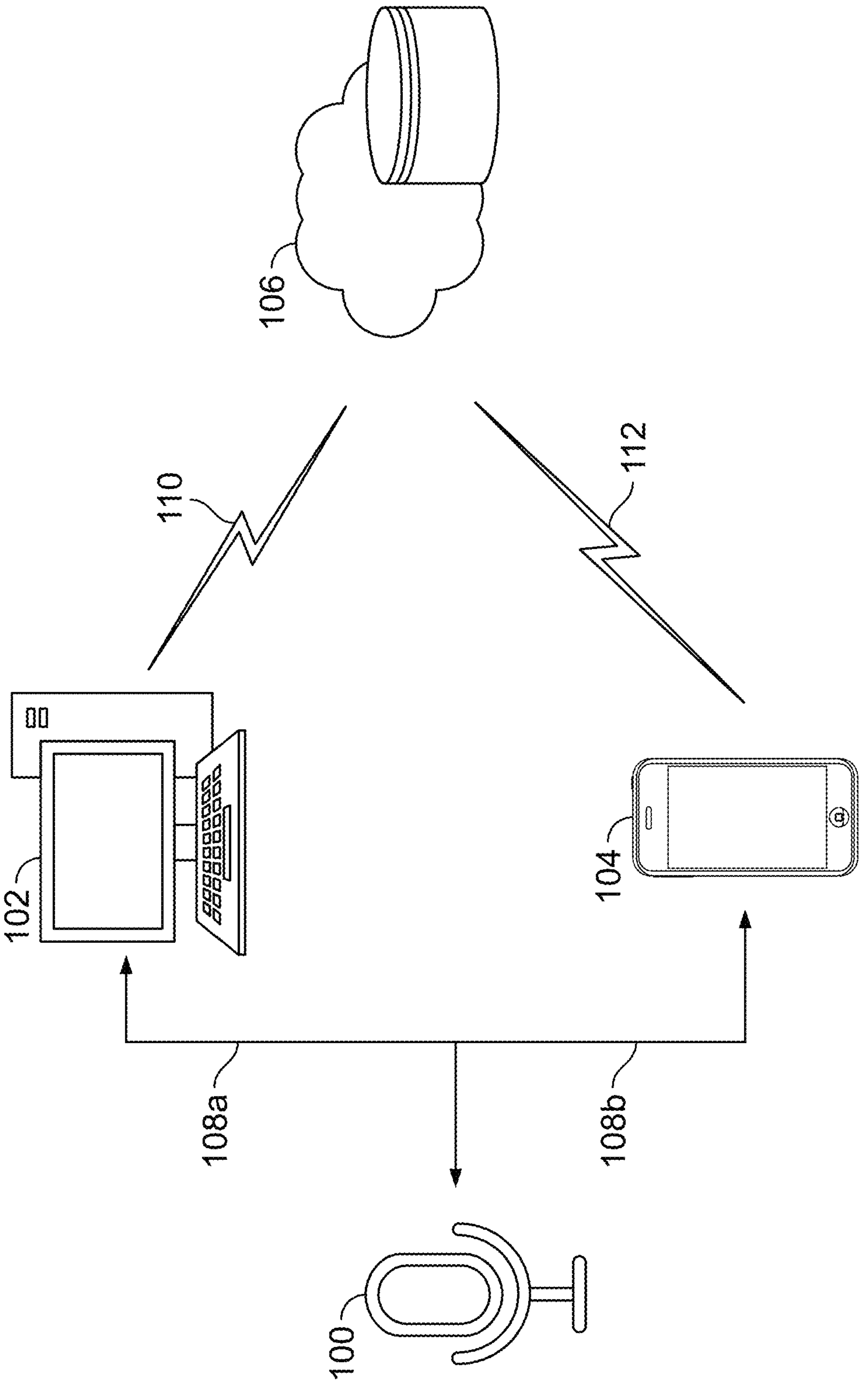
FIG. 1 illustrates an example network architecture that may be used to implement one or more illustrative aspects described herein.

FIG. 1 illustrates an example of a network architecture that may be used to implement one or more illustrative aspects described herein in a standalone and/or networked environment. Device 100 may be an ambisonic microphone. Device 102 may be one or more computing devices, such as a desktop computer, a laptop computer, one or more cloud computing devices, one or more servers, etc. Device 104 may be a smartphone or tablet. Device 100 may be connected (wired or wirelessly) to and/or in communication with one or more of devices 102 and/or 104. Device 100 may be connected (wired or wirelessly) to and/or in communication with one or more other devices (not shown) including, but not limited to, a mixing console, a recording console, and the like. Any one or more of devices 100, 102, 104, and 106 may be any type of known computer or server. In one or more examples, device 102 and/or device 104 may include a user interface, such as a graphical user interface, to allow a user to interact with the system. In one or more examples, device 106 may comprise a data server, such as a cloud-based data server. Devices 100, 102, 104, and/or 106 may be interconnected via a wide area network (WAN), such as the Internet, and/or via any other network. For example, one or more other networks may also or alternatively be used, such as a local area network (LAN), a wireless network, a personal network (PAN), and the like. Devices 100, 102, 104, and/or 106, and/or other devices (not shown), may or might not be communicatively connected to one or more networks via twisted pair wires, coaxial cable, fiber optics, radio waves, and/or other communication media. In one or more examples, device 100 may be communicatively connected to device 102 and/or device 104 via connections 108*a* and/or 108*b*, respectively. Device 102 and/or device 104 may connect to device 100 via connections 108*a* and/or 108*b* using any one or more of a variety of different connectors, such as a LEMO connector, an XLR connector, a Lightning® connector, a TQG connector, a TRS connector, a USB connector (including, but not limited to, USB type A, type B, type C, Mini B, Micro B), and/or one or more RCA connectors. Connections 108*a* and/or 108*b* may be wireless and connect to the device 100 using any one or more protocols, such as WiMAX, LTE, Bluetooth, Bluetooth Broadcast, GSM, 3G, 4G, 5G, 6G, Zigbee, 60 GHz Wi-Fi, Wi-Fi (e.g., compatible with IEEE 802.11a/b/g/n/ac/ad/af/ah/ai/aj/aq/ax/ay/ba/be), one or more proprietary wireless connection protocols, one or more NFC protocols, and/or any other protocol(s). Where the connection is wireless, devices 102 and 104 (and/or their respective transmitters, receivers, or transceivers) and device 100 may include a wireless communications interface. In one or more examples, device 102 may be communicatively connected to device 106 via connection 110, and/or device 104 may be communicatively connected to device 106 via connection 112.

Figure 2:
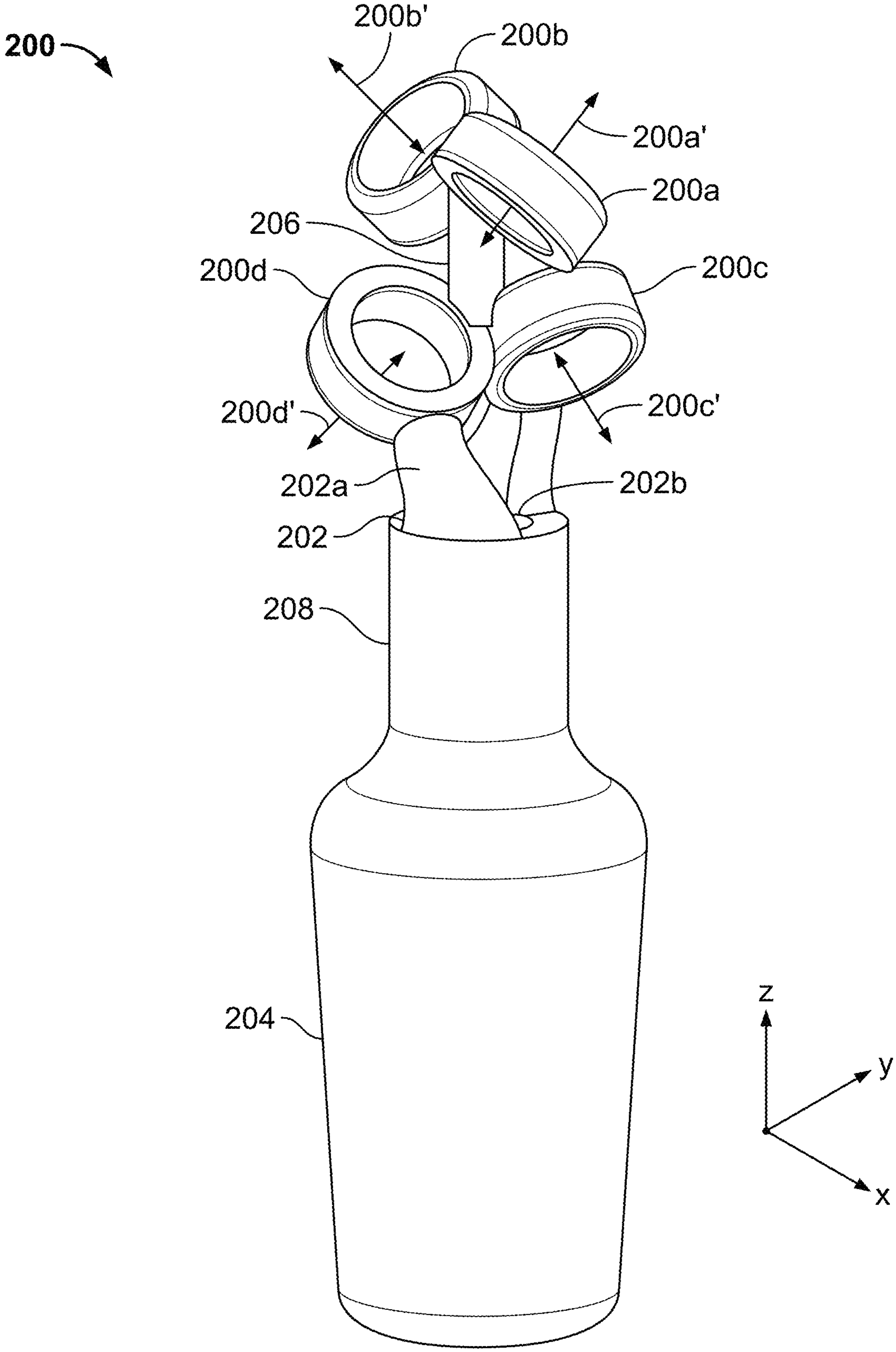
FIG. 2 illustrates a perspective view of an example ambisonic microphone that may be used to implement one or more illustrative aspects described herein.

FIG. 2 illustrates a perspective view of an example ambisonic microphone 200 (hereinafter referred to as "microphone 200") that may be used to implement one or more illustrative aspects described herein. Microphone 200 may include microphone capsules 200*a*-200*d* (hereinafter collectively referred to as "microphone capsules"). Microphone 200 may include any quantity of microphone capsules, such as more or less than microphone capsules 200*a*-200*d*. The microphone capsules may be any type of capsule, such as condenser (e.g., including large- and small-diaphragm and electret condenser), dynamic (e.g., including moving coil and ribbon microphones), and/or micro-electromechanical systems (MEMS), among others. The microphone capsules may be constructed according to one or more geometries (e.g., round, oval, elliptical, rectangular, etc.).

Microphone 200 may include yoke 202. Yoke 202 may be constructed according to one or more shapes and/or geometries. Yoke 202 may include a protruding member 206. Protruding member 206 may be constructed according to one or more shapes or geometries. Member 206 may be substantially columnar. One or more of the microphone capsules may be coupled to yoke 202 along protruding member 206. One or more of the microphone capsules may be electrically connected to yoke 202 and/or protruding member 206. Protruding member 206 may define a substantially vertical axis (further described with respect to FIG. 3) along which the microphone capsules may be disposed. The microphone capsules may be integrally molded to member 206 or detachably coupled to member 206. The microphone capsules may be rotatably and/or pivotably coupled to member 206 such that a user may variably rotate and/or pivot the direction of microphone capsules.

Microphone 200 may include a handle 204. Handle 204 may include a neck 208. Yoke 202 may be coupled to handle 204 at neck 208. Yoke 202 may be electrically connected to handle 204 and/or neck 208. Yoke 202 may be integrally molded to handle 204. Yoke 202 may be detachably coupled to handle 204. Yoke 202 may include legs 202*a* and 202*b*. Legs 202*a* and 202*b* may be integrally molded to handle 204 and may be electrically connected to handle 204. Legs 202*a* and 202*b* may be detachably coupled to handle 204. Legs 202*a* and/or 202*b* may be rotatably and/or pivotably coupled to handle 204, which may allow a user to rotate and/or pivot the orientation of one or more of the microphone capsules about the neck 208 of handle 204. Yoke 202 may be configured to swivel on the neck 208 of handle 204. Yoke 202 and/or member 206 may house some or all of the electronic components described and discussed herein.

Figure 4A:
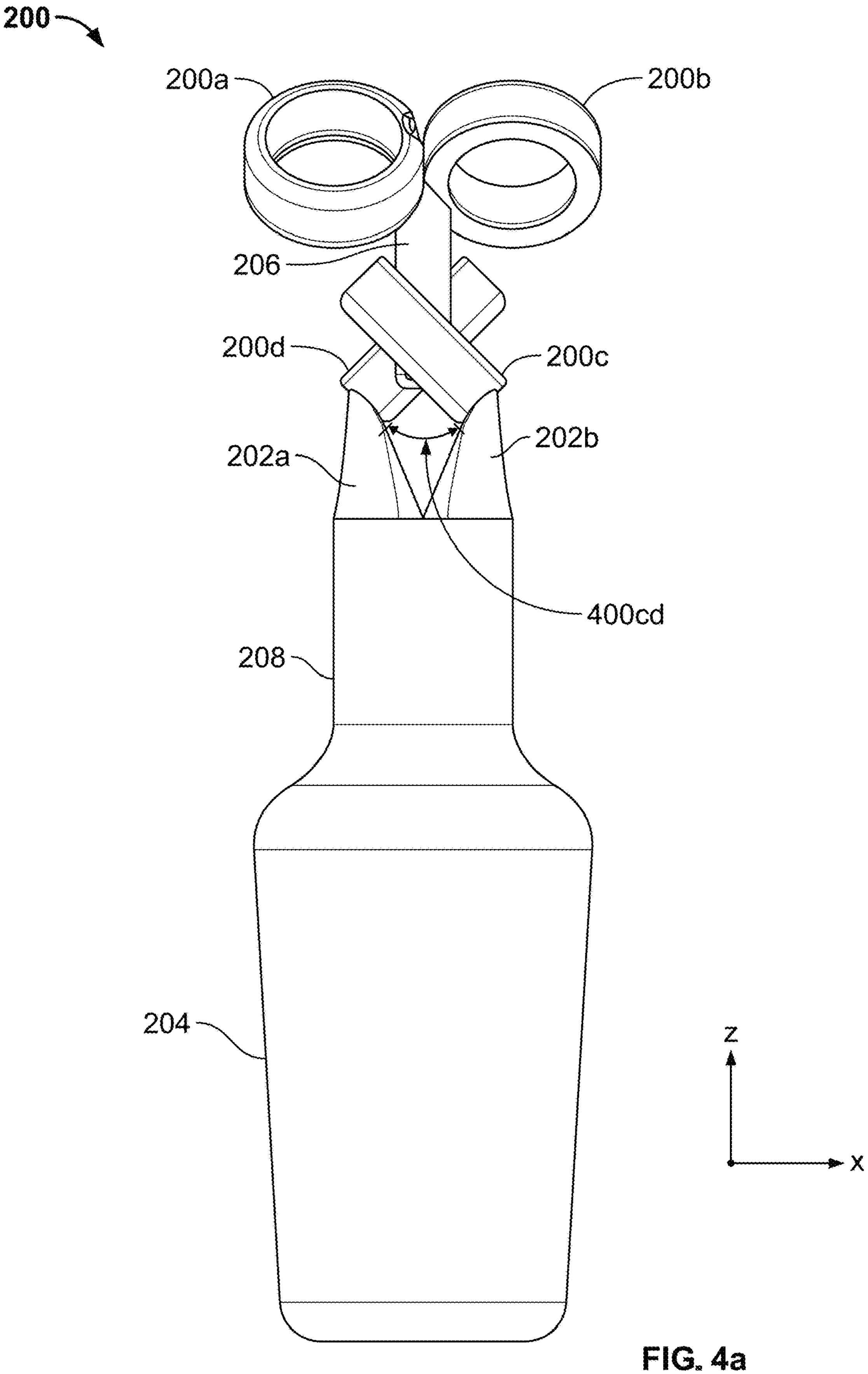
FIG. 4*a* illustrates a right-side view of the example ambisonic microphone of FIG. 1.
Figure 4B:
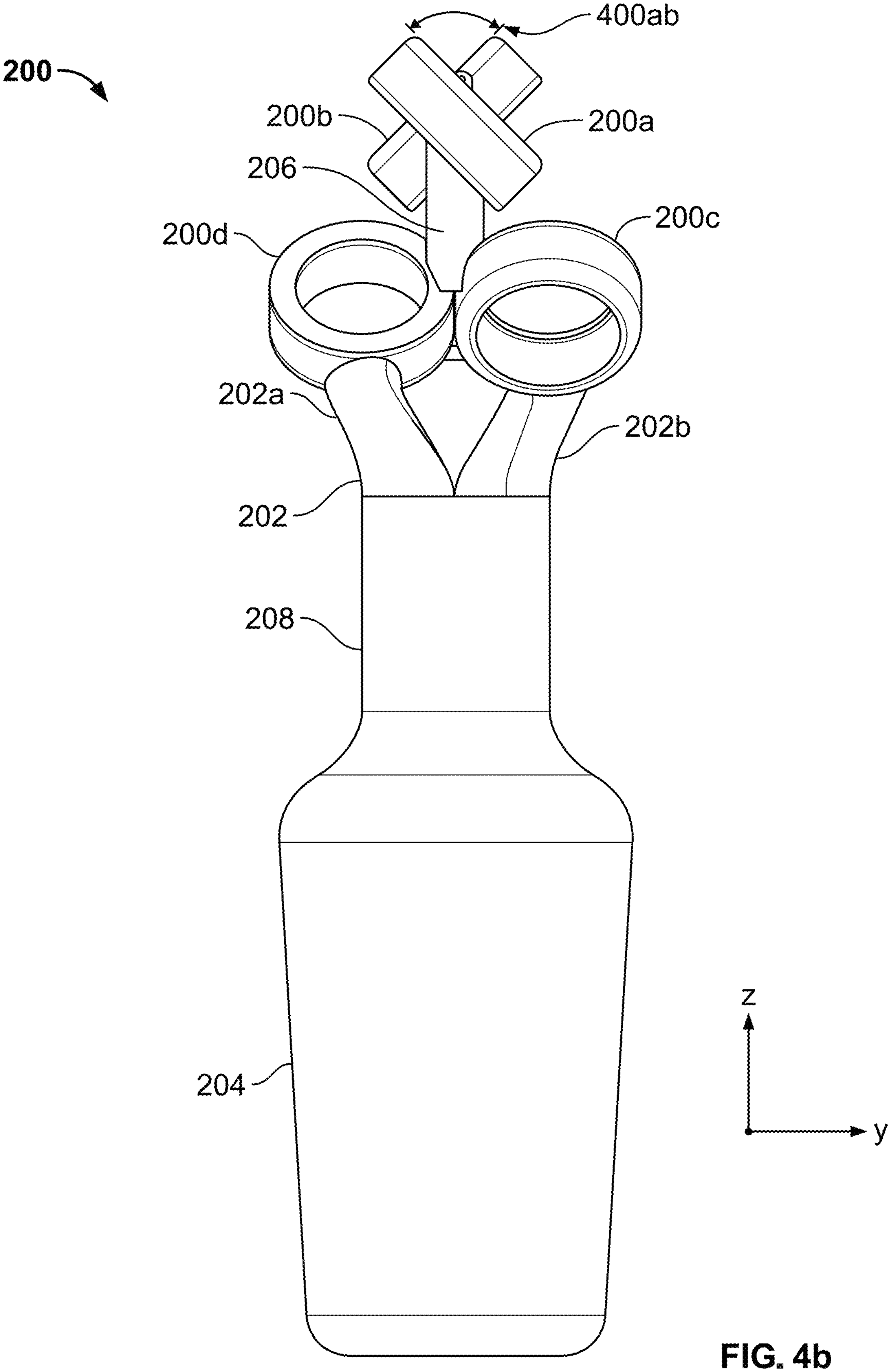
FIG. 4*b* illustrates a front view of the example ambisonic microphone of FIG. 1.
Figure 4C:
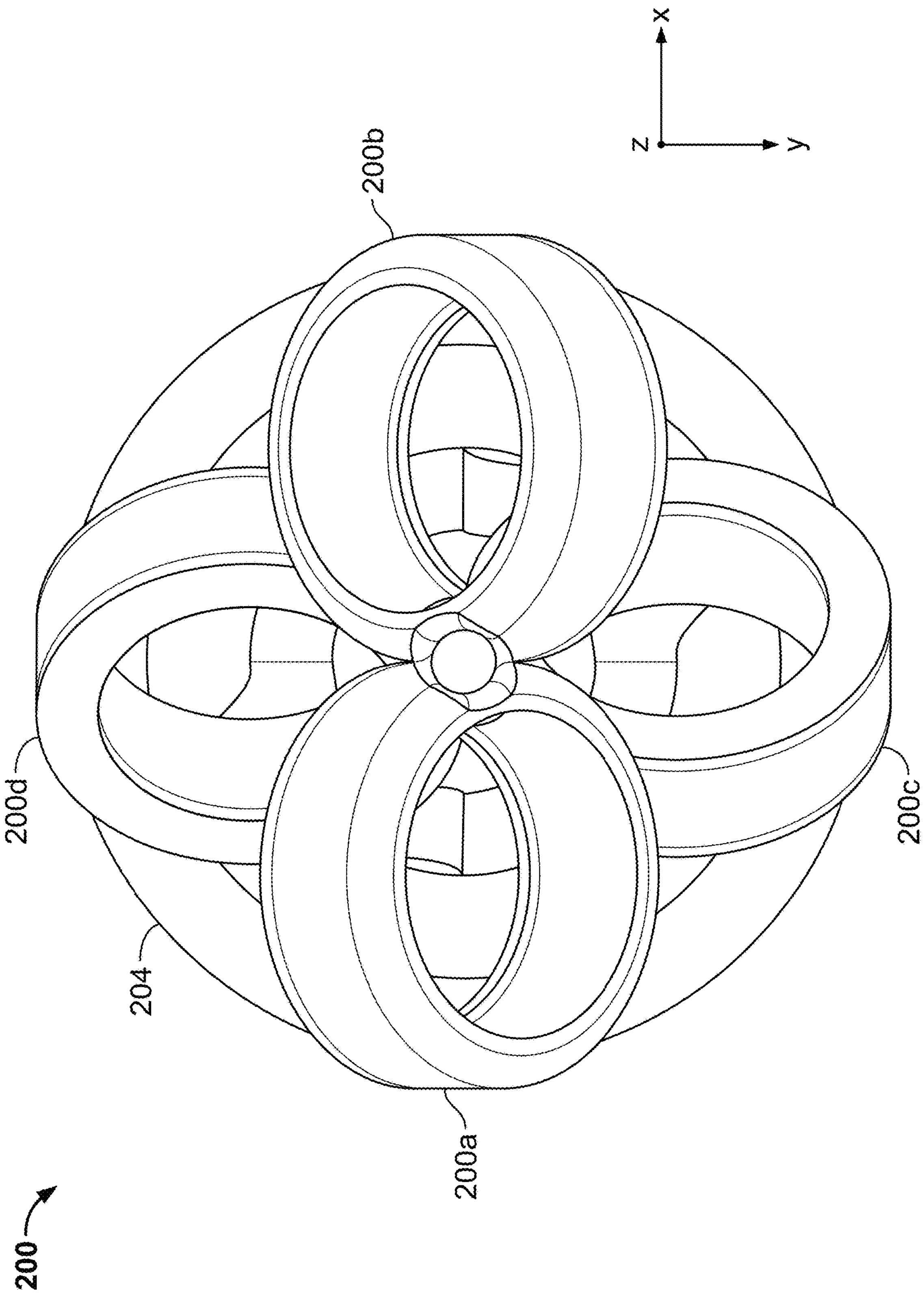
FIG. 4*c* illustrates a top-down view of the example ambisonic microphone of FIG. 1.
Figure 4D:
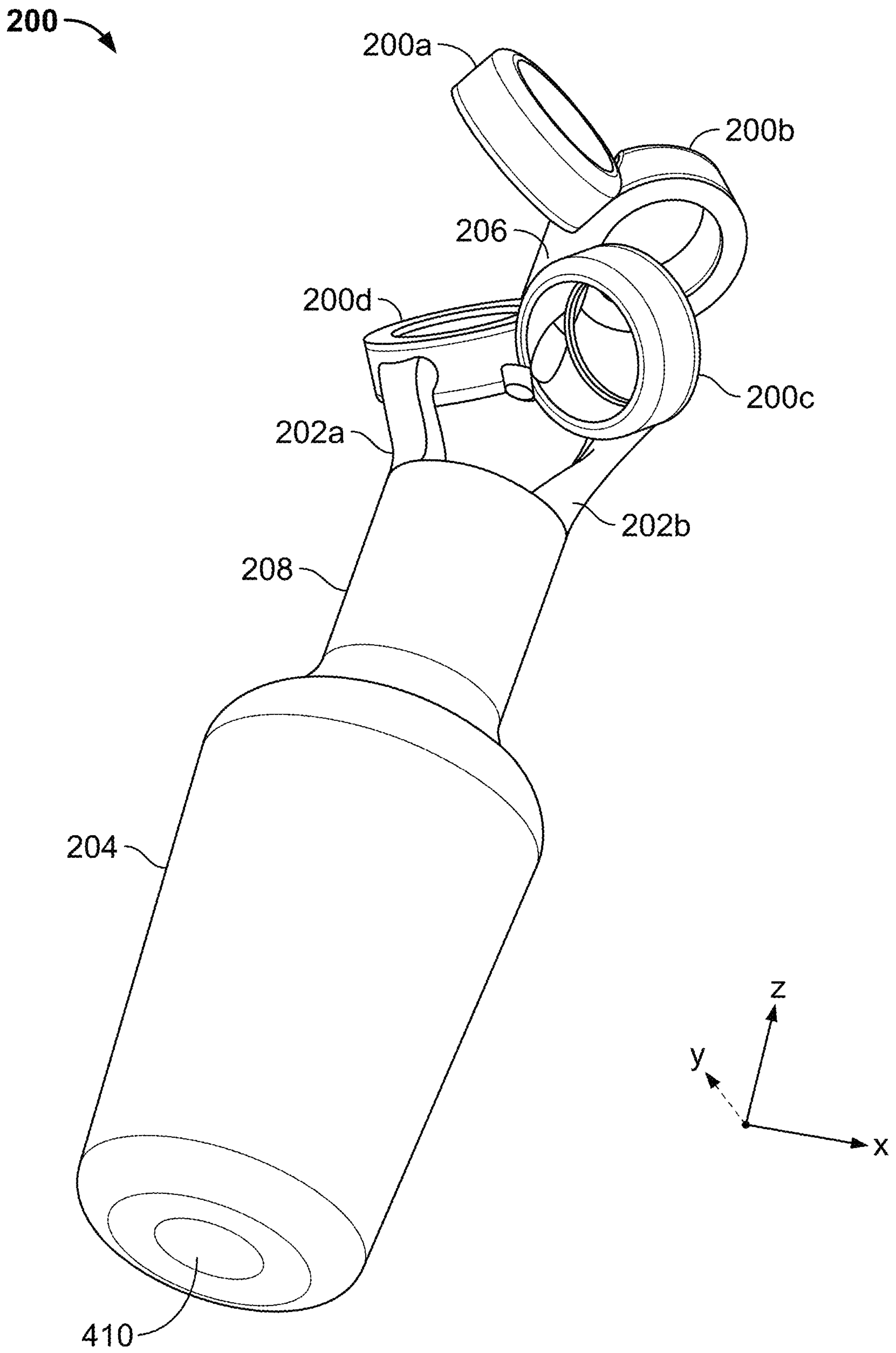
FIG. 4*d* illustrates another perspective view of the example ambisonic microphone of FIG. 1.

Handle 204 and/or neck 208 may be constructed according to any number of shapes or geometries. Handle 204 may be adapted for handheld use and may be constructed according to a number of ergonomic geometries. Handle 204 and/or neck 208 may house some or all of the electronic components described and discussed herein (e.g., conversion module 500). Handle 204 may be adapted as a mounting fixture compatible with one or more cameras or stands, including tripod stands (discussed in greater detail with respect to FIG. 4*d*). Handle 204 may be adapted for both handheld use and as a mounting fixture. Handle 204 and/or neck 208 may include an output port 512 (discussed with respect to FIG. 5) electrically connected to n-channel D/A converter 511, memory 503, and/or processor 504 (also discussed with respect to FIG. 5).

Microphone capsule 200*a* may be positioned in a direction indicated by line 200*a*'. Microphone capsule 200*b* may be positioned in a direction indicated by line 200*b*'. Microphone capsule 200*c* may be positioned in a direction indicated by line 200*c*'. Microphone capsule 200*d* may be positioned in a direction indicated by line 200*d*'. Lines 200*a*', 200*b*', 200*c*', and 200*d*' may represent an axis of maximum sensitivity (i.e., an axis through the center of the microphone capsule projecting infinitely in the positive direction) and minimum sensitivity (i.e., said axis projecting infinitely in the negative, or opposite, direction) for microphone capsules 200*a*, 200*b*, 200*c*, and 200*d*, respectively. The axes of minimum sensitivity of microphone capsules 200*a* and 200*d* (i.e., lines 200*a*' and 200*d*', respectively) may or might not intersect at a point in space (i.e., lines 200*a*' and 200*d*' may share at least one coincident point of intersection). The axes of minimum sensitivity of microphone capsules 200*b* and 200*c* (i.e., lines 200*b*' and 200*c*', respectively) may or might not intersect at a point in space (i.e., lines 200*b*' and 200*c*' may share at least one coincident point of intersection).

Microphone capsules 200*a*-200*d* may be geometrically arranged and compactly nested relative to one another such that the microphone capsules may exhibit a consistent and/or stable polar response at high frequencies. The microphone capsules may be compactly nested together to help minimize phase-related errors and/or to help provide higher spatial/localization accuracy. The microphone capsules may be geometrically oriented according to aspects described herein to reduce the acoustic shading due to structural interference introduced by one or more adjacent microphone capsules. That is, the geometric orientation of the microphone capsules may reduce acoustic shading by reducing the cross-section(s) of the obstruction caused by adjacent microphone capsules, which may help improve high frequency response.

Figure 3A:
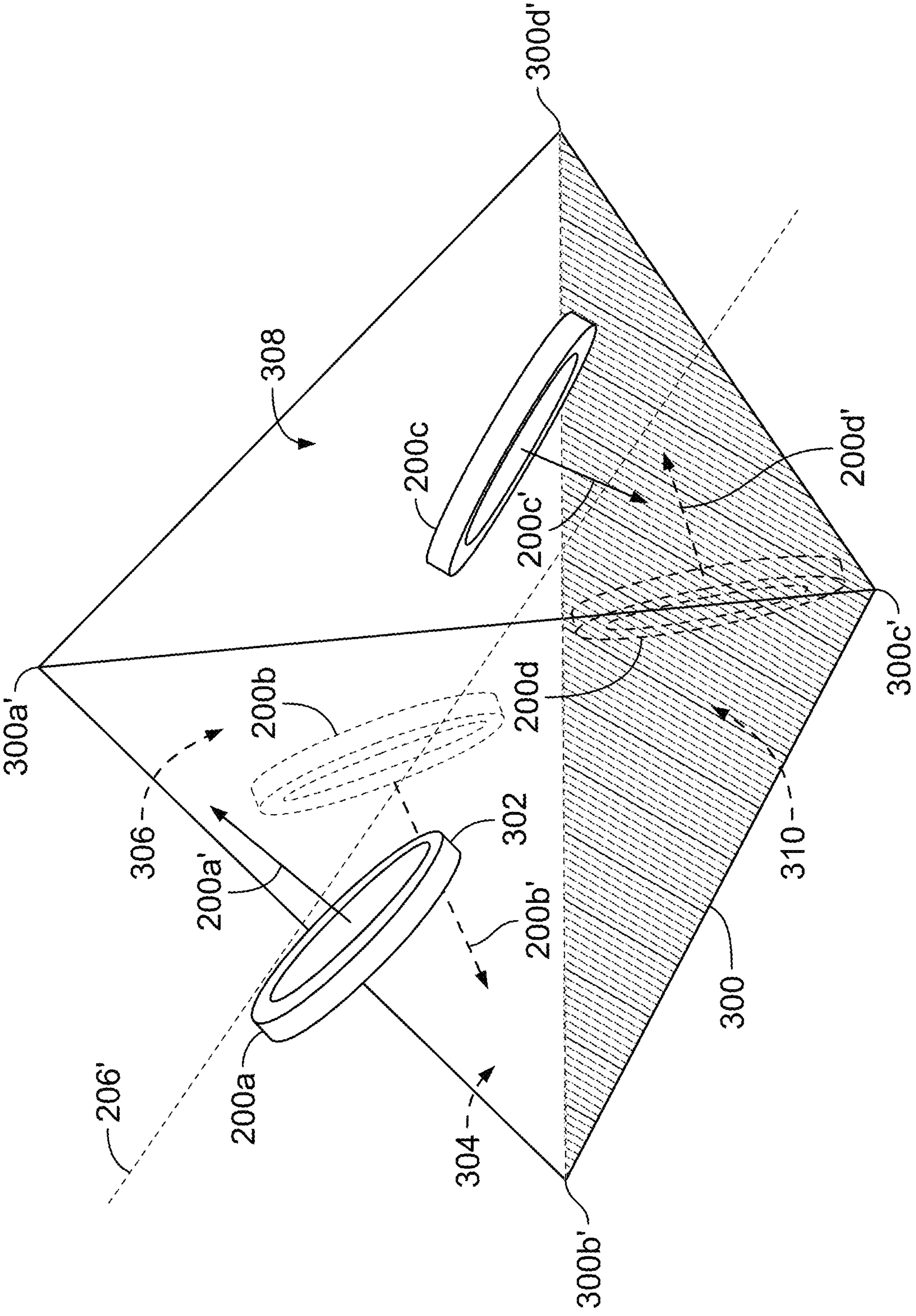
FIG. 3*a* illustrates an example geometric representation of a plurality of microphone capsules of the example ambisonic microphone of FIG. 2 that may be used to implement one or more illustrative aspects described herein.

FIG. 3*a* illustrates an example geometric representation of the orientations of microphone capsules 200*a*-200*d* of ambisonic microphone 200 about notional tetrahedron 300. Notional tetrahedron 300 may assume the geometry of any number of types of tetrahedra. Notional tetrahedron 300 may be a regular tetrahedron, in which all four triangular faces are equilateral triangles and all edges are the same length. Notional tetrahedron 300 may be an irregular tetrahedron, an isosceles tetrahedron, or a trirectangular tetrahedron, etc.

As shown in FIG. 3*a*, the microphone capsules may be oriented on one of four respective triangular faces of notional tetrahedron 300. For example, microphone capsule 200*a* may be disposed at the centroid (i.e., the point at which three medians of a triangular face of the tetrahedron intersect) of a face 304 of notional tetrahedron 300. Microphone capsule 200*a* may be disposed at any number of points on face 304. Face 304 may be defined by vertices 300*a*', 300*b*' and 300*c*'. Microphone capsule 200*a* may include an outer edge 302 that defines an outer perimeter of microphone capsule 200*a*. Edge 302 of microphone capsule 200*a* may be tangent to face 304 of tetrahedron 300. Microphone capsule 200*a* may be oriented such that the capsule generally faces the direction of vertex 300*a*' (represented by line 200*a*'). Line 200*a*' might not intersect vertex 300*a*'. The face of microphone capsule 200*a* may define a plane that is substantially (e.g., ±10 degrees) orthogonal (i.e., perpendicular) to the plane defined by the corresponding face of notional tetrahedron 300 (e.g., the face defined by vertices 300*a*', 300*b*' and 300*c*'). Stated differently, line 200*a*' may be substantially parallel (e.g., ±10 degrees) to the plane defined by the face of notional tetrahedron 300. In an example, the face of microphone capsule 200*a* might not be orientated orthogonally relative to face 304. The face of microphone capsule 200*a* may be oriented parallel to face 304. The face of microphone capsule 200*a* may be oriented parallel and substantially tangent to face 304. Microphone capsule 200*a* may be disposed on face 304 of notional tetrahedron 300 such that the plane defined by face 304 intersects one or more points of capsule 200*a* (i.e., edge 302 of capsule 200*a* might not be tangent to face 304).

Microphone capsule 200*b* may or might not be disposed at the centroid of face 306. Microphone capsule 200*b* may be disposed at any number of points on face 306. Face 306 may be defined by vertices 300*a*', 300*b*', and 300*d*'. Microphone capsule 200*c* may or might not be disposed at the centroid of face 308. Capsule 200*c* may be disposed at any number of points on face 308. Face 308 may be defined by vertices 300*a*', 300*c*', and 300*d*'. Capsule 200*d* may or might not be disposed at the centroid of face 310. Capsule 200*d* may be disposed at any number of points on face 310. Face 310 may be defined by vertices 300*b*', 300*c*', and 300*d*'. Capsules 200*b*-200*d* may include respective edges that are tangent to faces 306, 308, and 310, respectively, of notional tetrahedron 300. Microphone capsule 200*b* may be disposed on face 306 of notional tetrahedron 300 such that the plane defined by face 306 intersects one or more points of capsule 200*b* (i.e., edge of capsule 200*b* might not be tangent to face 306). Microphone capsule 200*c* may be disposed on face 308 of notional tetrahedron 300 such that the plane defined by face 308 may intersect one or more points of capsule 200*c* (i.e., edge of capsule 200*c* might not be tangent to face 308). Microphone capsule 200*d* may be disposed on face 310 of notional tetrahedron 300 such that the plane defined by face 310 may intersect one or more points of capsule 200*d* (i.e., edge of capsule 200*d* might not be tangent to face 310).

Microphone capsule 200*b* may be oriented in a direction substantially towards vertex 300*b*' (represented by line 200*b*'). Capsule 200*c* may be oriented in a direction substantially towards vertex 300*c*' (represented by line 200*c*'). Capsule 200*d* may be oriented in a direction substantially towards vertex 300*d*' (represented by line 200*d*'). The faces (i.e., the side of the microphone capsules corresponding to maximum acoustic sensitivity) of microphone capsules 200*b*, 200*c*, and 200*d* may each define a plane that is substantially (e.g., ±10 degrees) orthogonal (i.e., perpendicular) to the plane defined by the corresponding face of notional tetrahedron 300 (i.e., face 304 for capsule 200*a*, face 306 for capsule 200*b*, face 308 for capsule 200*c*, and face 310 for capsule 200*d*). In an example, the faces of microphone capsules 200_b_, 200_c_, and/or 200_d_ might not be orientated orthogonally relative to faces 306, 308, and/or 310, respectively. The faces of microphone capsules 200_b_, 200_c_, and/or 200_d_ may be oriented parallel to faces 306, 308, and/or 310, respectively. The faces of microphone capsules 200_b_, 200_c_, and/or 200_d_ may be oriented parallel and substantially tangent to faces 306, 308, and/or 310, respectively.

As has been discussed, microphone capsules 200_a_-200_d_ may be compactly nested with respect to one another which may help ensure a consistent polar response of the microphone capsules at high frequencies and may help reduce phase-related errors. Microphone capsules 200_a_-200_d_ may be geometrically arranged to help reduce acoustic shading that any one microphone capsule is subjected to from the other microphone capsules. While the microphone capsules may be generally oriented or arranged as described above, the distances between any two given microphone capsules may vary (e.g., may vary widely).

Figure 3B:
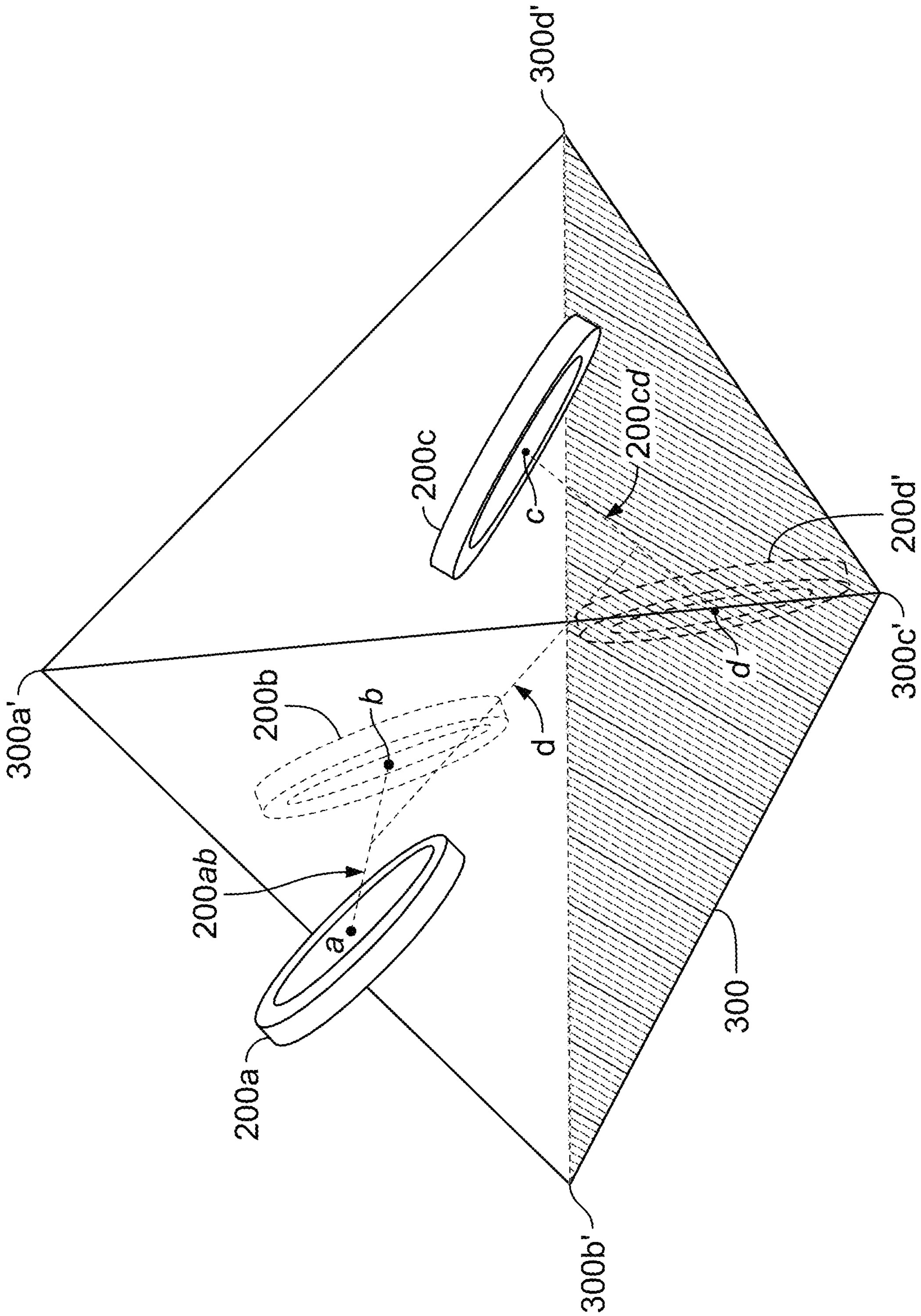
FIG. 3*b* illustrates another example geometric representation of a plurality of microphone capsules of the example ambisonic microphone of FIG. 2 that may be used to implement one or more illustrative aspects described herein.

For example, as show in FIG. 3_b_, the center a of microphone capsule 200_a_ and the center b of capsule 200_b_ may be horizontally spaced from one another by a distance ab (represented by line 200_ab_). The center c of microphone capsule 200_c_ and the center d of capsule 200_d_ may be horizontally spaced from one another by a distance cd (represented by line 200_cd_). Distances ab and cd may be dictated by the particular geometry of notional tetrahedron 300 (i.e., whether notional tetrahedron is a regular tetrahedron, irregular tetrahedron, isosceles tetrahedron, etc.). The distance ab may be approximately twice the radius (or width, as the case may be) of microphone capsules 200_a_ or 200_b_ measured from their respective centers to their respective outer diameters (or perimeters, as the case may be). The distance cd may be approximately twice the radius (or width) of microphone capsules 200_c_ or 200_d_ measured from their respective centers to their respective outer diameters (or perimeters). The distance ab and/or cd may be more than approximately twice the radius (or width) of microphone capsules 200_a_ or 200_b_ and 200_c_ or 200_d_, respectively.

Microphone capsules 200_a_ and 200_b_ may be offset from microphone capsules 200_c_ and 200_d_ by a distance d along a z-axis of yolk 206 (as shown in FIG. 2 and represented by line 206' in FIG. 3_a_). Distance d may be dictated by the particular geometry of notional tetrahedron 300 (i.e., whether notional tetrahedron is a regular tetrahedron, irregular tetrahedron, isosceles tetrahedron, etc.). Distance d may be approximately twice the radius (or width) of microphone capsules 200_a_, 200_b_, 200_c_, or 200_d_ measured from their respective centers to their respective outer diameters (or perimeters, as the case may be). Distance d may be more or less than approximately twice the radius (or width) of microphone capsules 200_a_, 200_b_, 200_c_, or 200_d_ measured from their respective centers to their respective outer diameters (or perimeters).

As has been discussed, notional tetrahedron 300 may assume the shape of an irregular tetrahedron (i.e., a tetrahedron that does not have four equilateral face). In an example, microphone capsules 200_a_, 200_b_, 200_c_, and 200_d_ may be generally disposed on the faces of notional tetrahedron 300 at a constant radius from a central point such that the array of microphone capsules is radially symmetric when projected onto a plane. The faces of capsules 200_a_, 200_b_, 200_c_, and 200_d_ may be equally spaced relative to one another and may form an angle of about 90 degrees relative to adjacent capsules. Capsules 200_a_, 200_b_, 200_c_, and 200_d_ may be arranged into a first and second vertical plane, such that each vertical plane contains two microphone capsules that share an intersecting axis. Each pair of microphone capsules may be rotated about the respective shared axis such that the respective axes of maximum sensitivity are orthogonal. The second vertical plane may be rotated about 90 degrees and mirrored about its axis of rotation. As a result, microphone capsules 200_a_, 200_b_, 200_c_, and 200_d_ may be substantially outward-facing. The respective axes of maximum sensitivity of microphone capsules 200_a_, 200_b_, 200_c_, and 200_d_ might not overlap. The upper pair or microphone capsules may be largely upward-facing and the lower pair of microphone capsules may be largely downward-facing.

FIGS. 4_a_, 4_b_, 4_c_, and 4_d_ illustrate various side and perspective views of microphone 200. FIG. 4_a_ illustrates a right-side view of ambisonic microphone 200. The faces of microphone capsules 200_c_ and 200_d_ (i.e., the sides of microphone capsules 200_c_ and 200_d_ that correspond to the maximum acoustic sensitivity of capsules 200_c_ and 200_d_) may be oriented substantially downward-facing. The faces of capsules 200_c_ and 200_d_ may be oriented relative to one another to form an angle of about 70 degrees (as indicated by angle 400_cd_). The faces of capsules 200_c_ and 200_d_ may be oriented relative to one another to form an angle of more or less than 70 degrees (i.e., angle 400_cd_ may range, for example, from 65 degrees to 95 degrees).

FIG. 4_b_ illustrates a front view of the ambisonic microphone 200. The faces of microphone capsules 200_a_ and 200_b_ (i.e., the sides of microphone capsules 200_a_ and 200_b_ that correspond to the maximum acoustic sensitivity of capsules 200_a_ and 200_b_) may be oriented substantially upward-facing. The faces of capsules 200_a_ and 200_b_ may be oriented relative to one another to form an angle of about 70 degrees (as indicated by angle 400_ab_). The faces of capsules 200_a_ and 200_b_ may be oriented relative to one another to form an angle of more or less than 70 degrees (i.e., angle 400_ab_ may range, for example, from 65 degrees to 95 degrees).

FIG. 4_c_ illustrates a top-down view of the ambisonic microphone 200.

With respect to FIG. 4_d_, handle 204 may be adapted as a mounting fixture compatible with one or more cameras or stands (not shown). Microphone 200 may be used in combination with a camera and/or camera array that may be configured to produce a 360-degree field-of-view, such as a camera and/or camera array used for virtual reality applications and/or 360-degree video. Handle 204 may include a coupling mechanism 410 adapted to couple in any number of ways to any number of camera mounts, stands, etc. Coupling mechanism 410 may be threaded. Coupling mechanism 410 may be configured with ball bearings, etc., to allow microphone 200 to swivel when mated with a camera mount or stand. Coupling mechanism 410 may include a ratchet-style assembly (not shown) to allow a user to variably and securely position microphone 200 in a desired orientation respective to the camera array and/or camera stand.

Figure 5:
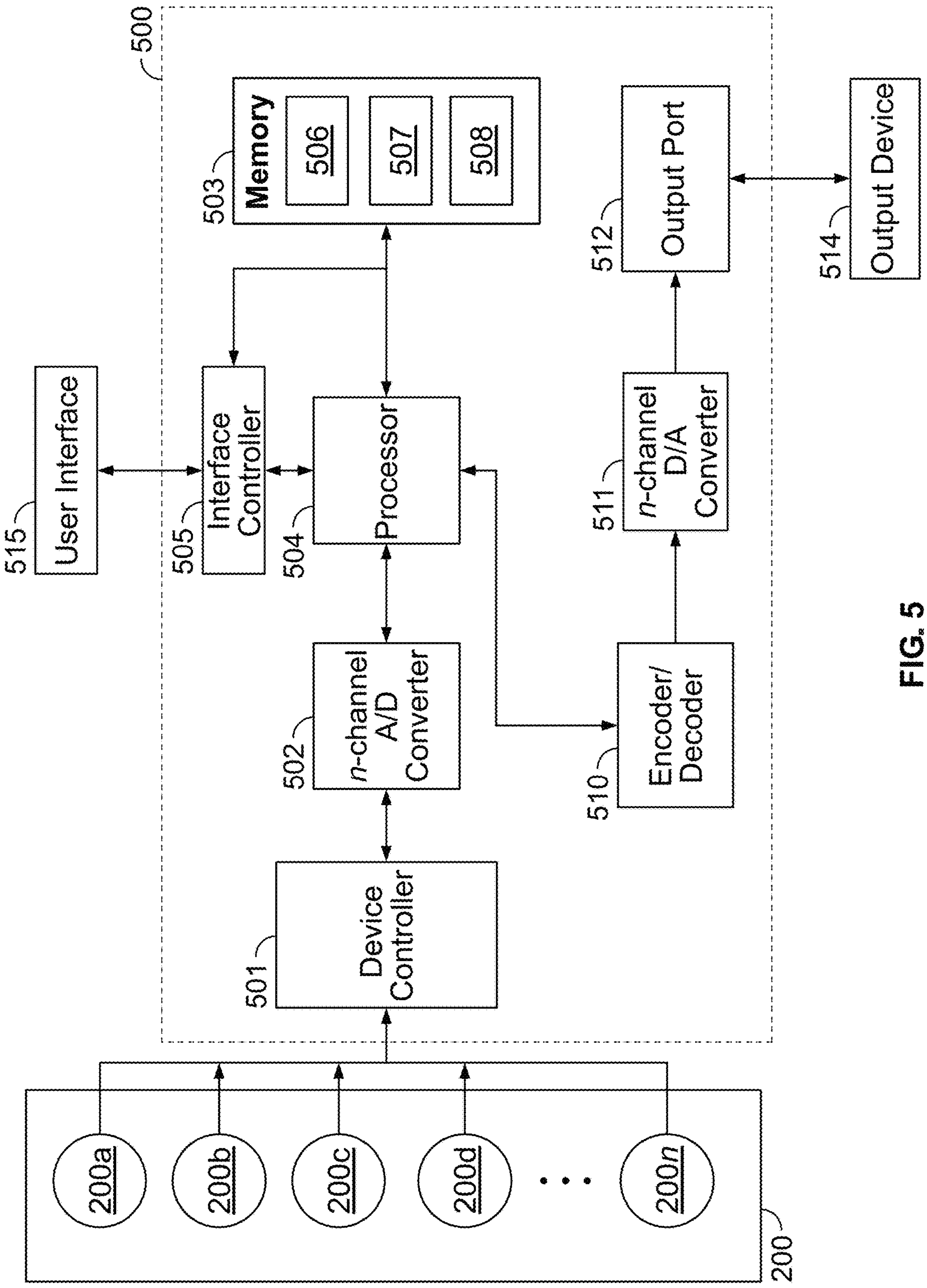
FIG. 5 illustrates an example system architecture that may be used to implement one or more illustrative aspects described herein.

FIG. 5 illustrates an example of a system architecture that may be used to implement one or more illustrative aspects described herein. One or more of microphones 100 and/or 200 (hereinafter collectively referred to as "microphone 200") may include and/or be communicatively connected to a processor 504 for controlling overall operation of the microphones. Microphone 200 may include microphone capsules 200_a_, 200_b_, 200_c_, 200_d_, and 200_n_. Microphone 200 may include and/or be communicatively connected to n-channel analog-to-digital ("A/D") converter 502. In one or more examples, n may be greater than or equal to 2, 3, 4, or 5. The number of n microphone capsules may correspond to the number of n channels of A/D converter 502 (i.e., the number of microphone capsules and the number of channels in A/D converter 502, both represented as the integer n, may be the same). Microphone 200 may include and/or be communicatively connected to memory 503. The memory 503 may store operating system software 506 for controlling overall operation of microphone 200 and/or control logic 507 for instructing microphone 200 to perform aspects described herein. Functionality of the control logic 507 may refer to operations or decisions made automatically based on rules coded into the control logic 507, made manually by a user providing input into the system, and/or a combination of automatic processing based on user input (e.g., queries, data updates, user-selected modes, a list of input devices previously setup with the software application, etc.). Memory 503 may store data used in performance of one or more aspects described herein, including in at least one database 508. Memory may store other data. For example, where the memory 503 is part of, for example, microphone 200, the memory may store its operating system and/or the software application that performs aspects described herein, user preferences such as preferred modes, a list of input devices (such as microphone 200, among others) previously setup with the software application, communication protocol settings, and/or data supporting any other functionality of the microphones.

One or more aspects may be embodied in computer-usable or readable data and/or computer-executable instructions, such as in one or more program modules, executed by one or more computers or other devices as described herein, such as, for example, microphone 200. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, Perl, PHP, Ruby, JavaScript, and the like. The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

With further reference to FIGS. 1 and 5, the ambisonic microphone 200 may be implemented in device 100. The n-channel A/D converter 502, memory 203, processor 504, n-channel digital-to-audio ("D/A") converter 511, and output port 512 may be implemented in microphone 200 and/or any one or more of devices 102, 104, and/or 106, as well as (or alternatively) in one or more additional devices (not shown). Aspects described herein may be operational with numerous other general purpose and/or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, supercomputers configured to run online application programming interfaces (APIs), distributed computing environments that include any of the above systems or devices, and the like. Aspects of microphone 200 may be implemented as embedded software running in, for example, device 100. Aspects of microphone 200 may be implemented as an external signal processor, such as a hardware DSP module, a real-time software processor, an offline software processor, or a software plug-in (including VST, AU, and AAX formats). The ambisonic microphone 200 may be compatible with software or plugins for use with any number of video communications or video streaming platforms.

Microphone capsules 200*a*-200*d* may be configured to receive acoustic signals emanating from various directions in an acoustic environment. The microphone capsules may capture a set of audio signals in A-format. The set of audio signals may vary widely in duration (e.g. from less than one second to more than 1000 seconds). The microphone capsules may provide the set of A-format audio signals to an external device. Onboard processing of microphone 200 (e.g., conversion module 500, processor 504) may encode the set of A-format audio signals to B-format, C-format (or Ambisonic UHJ, such as nested multi-channel output formats), D-format (such as 3.1, 5.1, 5.1. n 7.1, 7.1.n and/or other surround sound formats, including custom speaker array formats and other formats with pre-encoded channels), G-format, mono, stereo, and/or to a binaural audio format for headphone listening (described further below with respect to FIG. 5). Processor 504 may render the A-format, B-format, C-format, D-format, and/or G-format audio signals for use in an external device. Microphone 200 may provide the rendered set of mono, stereo, binaural, B-format, C-Format, D-format, and/or G-format audio signals to an external device.

As shown in FIG. 5, ambisonic microphone 200 may include a conversion module 500 and/or be communicatively connected to the conversion module 500. Conversion module 500 may include a device controller 501. The device controller 501 may facilitate interaction from microphone capsules 200*a*-200*n* to various components of conversion module 500. Analog and/or digital audio may be transmitted from microphone 200 to the device controller 501. Digital data may be transmitted bidirectionally (from the microphone 200 to the device controller 501, and/or from the device controller 501 to microphone 200). Microphone 200 may include, for example, one or more universal serial bus (USB) connectors, one or more XLR connectors, one or more power connectors, and/or any other type of data and/or power connectors suitable for transporting signals such as power, digital data (including digital audio signals), and/or analog audio signals to and from the microphone 200. Where the connection is wired, the device controller 501 may further comprise a data interface (not shown) for communicating with microphone 200. For example, the data interface may comprise a USB interface and/or an XLR interface. While several wired connections are discussed between the device controller 501 and the microphone 200, other types of wired or wireless connections may be used. For example, the connection between the device controller 501 and microphone 200 may instead be a wireless connection, such as a Wi-Fi connection or other proprietary wireless connection protocols, a Bluetooth connection, a near-field connection (NFC), and/or an infrared connection. Where the connection is wireless, the device controller 501 and microphone 200 may include a wireless communications interface.

In operation, device controller 501 may receive a set of A-format audio signals captured with microphone capsules 200*a*-200*n*. Device controller 501 may route the set of A-format audio signals to A/D converter 502, which may provide a set of digital A-format audio signals to processor 504 for further processing. Processor 504 may provide the set of digital set of A-format audio signals to D/A converter 511 for output via output port 512 to an output device 514. The number of n channels of D/A converter 511 may correspond to the number of n channels of A/D converter and/or to the number of n microphone capsules (i.e., the number of channels in D/A converter 511, represented as the integer n, may be the same as the number of channels in A/D converter 502 and/or same as the number of microphone capsules). Output device 514 may be any of devices 102, 104, and/or other devices such as a mixing console, recording console, headphones, earphones, etc.

Converter module 500 may include an encoder/decoder 510. Encoder 510 may be configured to encode (or convert) the set of digital A-format audio signals to a set of B-format audio signals. Encode 510 may be configured to decode (or render) the set of B-format audio signals to D/A converter 511 and via port 512 for use in output device 514. As has been discussed, the orientation and arrangement of microphone capsules 200*a*-200*d* according to aspects described herein may minimize A-format to B-format conversion errors and localization inaccuracies that might typically result from the non-coincidence of the microphone capsules in an ambisonic microphone. As a result, the B-format stability (or bi-directional collapse point) of the microphone capsules may be improved at higher frequencies. That is to say that the directivity patterns and frequency response patterns of the microphone capsules may remain stable while capturing audio signals with frequencies occupying ranges from about 4-20 kHz. Encoder 510 may employ any number of time-domain processing techniques when performing A-format to B-format encoding of the set of audio signals. Encoder 510 and/or processor 504 may employ any number of purely time-domain processing techniques when performing A-format to B-format encoding of the set of audio signals. That is, encoder 510 and/or processor 504 might not perform Fast Fourier Transformation of the set of A-format audio signals before encoding to B-format. Rather, encoder 510 and/or processor 504 may analyze one or more waveforms of the set of audio signals. Encoder 510 and/or processor 504 might not convert the set of audio signals into spectral components and might not analyze those spectral components of the set of audio signals. In one or more examples, frequency response correction filters, equalization filters, and/or other corrective measures might be unnecessary. Encoder 510 and/or processor 504 may encode the set of A-format audio signals to B-format audio signals by employing the convention:

$$W = FLU + FRD + BLD + BRU$$

$$X = FLU + FRD - BLD - BRU$$

$$Y = FLU - FRD + BLD - BRU$$

$$Z = FLY - FRD - BLD + BRU$$

where W represents an omnidirectional microphone channel and X, Y, and Z represent bi-directional (or figure-of-eight) microphone channels; and where FLU may represent the signal captured by microphone capsule 200*a*, FRD may represent the signal captured by microphone capsule 200*c*, BLD may represent the signal captured by microphone capsule 200*d*, and BRU may represent the signal captured by microphone capsule 200*b*. The W-channel may be attenuated by about 3 dB (i.e., by a factor of $\sqrt{2}$ or 0.707). As a result of employing time-domain processing, processing latency may be reduced and microphone 200 may provide real-time A-format or decoded B-format audio signals for latency-critical applications such as livestreaming, etc. Encoder/decoder 510 may support any number of B-Format export formats, including, for example, FuMa, Ambix, and the like.

Encoder/decoder 510 may be configured to decode the set of B-format audio signals to a set of D-format audio signals. Converter module 500 may include an interface controller 505 communicatively connected to a user interface 515. The interface controller 505 may facilitate communication between a user interface 515 and the converter module 500. For example, the interface controller 505 may receive user indications and/or queries from user interface 515 and provide the indications and/or queries to the converter module for further actions described herein. The user interface 515 may comprise, for example, a capacitive-touch interface that a user may control via touch, or a graphical user interface. A companion software application (not shown) installed on the device 102 and/or device 104 may provide the user interface 515 and may perform some or all of the processing and decoding of the audio signals described herein.

The interface 515 may function in concert with some or all of the hardware and/or software components described herein to help simplify the setup and workflow of capturing spatial audio with microphone 200 and providing it to a consumer. The user interface 515 may present a user with several audio capture and conversion options. For example, interface 515 may provide the user with options to output captured audio signals in mono, stereo, binaural, A-format, B-format, C-format, D-format, and/or G-format audio standards to an external device. Interface 515 may provide the user with other pre- and/or post-recording processing options, such as filtering, equalization, compression, and steerable virtual microphones independent position/localization and gain adjustments, etc. Interface 515 may provide the user with a graphical representation of an acoustic sound field and may allow the user to create any number of virtual microphones and manipulate the polarity of said virtual microphones. Interface 515 may include a video feed window to allow a user to monitor the synchronization of incoming audio signals to either live or pre-recorded video data.

Any of the circuitry in FIG. 5 may be implemented, for example, as a programmable gate array (PGA), as a MOS integrated circuit (IC) chip, an application specific integrated circuit (ASIC), a complex programmable logic device (CPLD) a field-programmable gate array (FPGA) chip, or an analog electrical circuit. The ASIC could contain a transistor, such as a FET. Any of the operations described herein may be implemented with hardware, software, and/or a combination thereof.

Figure 6:
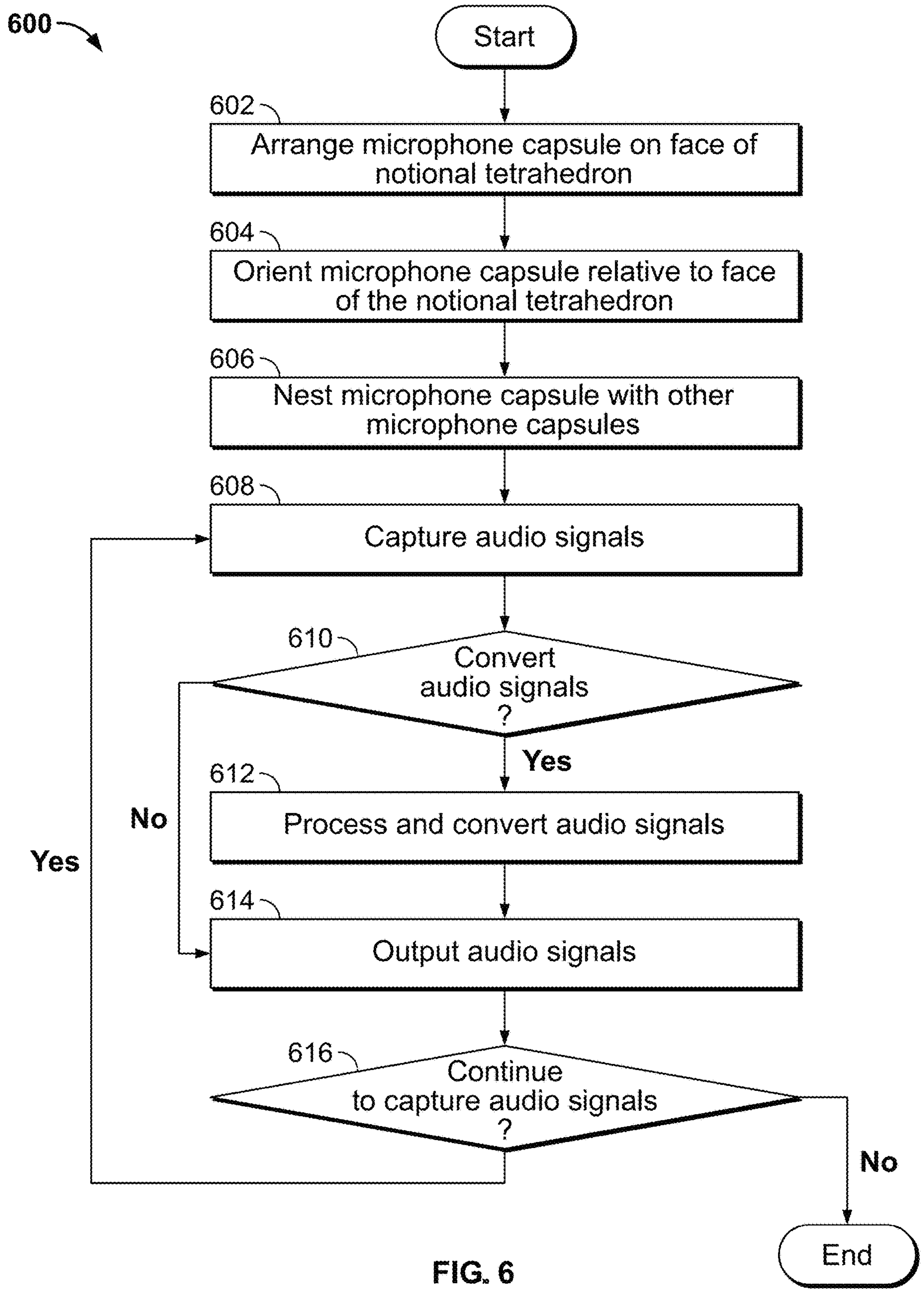
FIG. 6 illustrates an example flowchart of a method that may be performed to implement one or more illustrative aspects described herein.

FIG. 6 illustrates an example flowchart of method 600 that may be performed to implement one or more illustrative aspects described herein. Some or all of the steps of method 600 may be performed by microphone 200. Some or all of the steps of method 600 may be performed by a device connected to the microphone 200 (such as devices 102 and/or 104). Processor 504 coupled to memory 503 may control the overall operation of the microphone 200 as it performs steps 601-614. While method 600 shows particular steps in a particular order, the method may be further subdivided into additional sub-steps, steps may be combined, the steps may be performed in other orders, and some steps may be omitted without necessarily deviating from the concepts described herein.

In operation, one or more microphone capsules may be arranged or oriented in a first direction relative to a notional tetrahedron according to aspects described herein. For example, a first microphone capsule may be arranged on a first face of notional tetrahedron in a direction substantially toward a first vertex of the notional tetrahedron (Step 602). The face of the microphone capsule may be oriented relative to (or with respect to) the face of the notional tetrahedron (e.g., orthogonally, substantially orthogonally, parallel, substantially parallel) (Step 604). The first microphone capsule may be oriented relative to a second microphone capsule such that the axis of minimum sensitivity of the first capsule may share a coincident point with the axis of minimum sensitivity of the second capsule (i.e., the axes may intersect at a point in space). The axes of maximum sensitivity of the first and second microphone capsules might not share a coincident point with one another. The third and fourth microphone capsules may be oriented relative to one another such that the axis of minimum sensitivity of the third capsule may share a coincident point with the axis of minimum sensitivity of the fourth capsule (i.e., the axes may intersect at a point in space). The first, second, third, and/or fourth microphone capsules may be oriented with respect to one another to reduce structural interference and acoustic shading associated that may be caused by adjacent microphone capsules.

The first microphone capsule may be nested with one or more other microphone capsules in accordance with aspects described herein to help reduce phase-related errors. (Step 606). The microphone capsules may be configured to capture audio signals (Step 608). The user may wish to convert the set of captured audio signals (e.g., A-format audio signals) to any number of different audio standards (e.g., B-format, C-format, D-format, G-format, mono, stereo, binaural, etc.). The user may indicate, via an interface (such as interface 515) and/or microphone 200, that the user wishes for such conversion to occur and may specify the desired format. Based on receiving a conversion indication (Step 610: YES), the conversion module 500 may employ time-domain processing techniques as described herein to convert the A-format audio signals to the desired format (Step 612) for further processing and/or output to, for example, output device 514 (Step 614). In one or more examples, the output audio signals may be synced to a video feed, including a livestream, broadcast, etc. The user may wish to output the raw A-format audio signals to an external device. Based on receiving an indication to output the raw A-format audio signals (Step 610: NO), the conversion module 500 may provide the A-format audio signals to output port 512 for conversion and/or further processing by, for example, output device 514 (Step 614). The microphone capsules may automatically continue to capture audio signals indefinitely (Step 616: YES). Conversion module 500 may receive an indication to stop capturing audio signals (Step 616: NO), upon which method 600 may terminate.

The aspects described herein may be performed by a number of device configurations. For example, a user may connect, for example, microphones 100 and 200 to devices 102, 104, and/or other devices operating a software application capable of performing the operations described herein. In another example, the aspects described herein can be performed by a smartphone, desktop computer, laptop computer, and/or other devices having an internal microphone and a software application capable of performing the operations described herein. No other audio equipment might be necessary to perform the operations described herein.

An ambisonic microphone may comprise a plurality of microphone capsules. The plurality of microphone capsules may be geometrically arranged to reduce an acoustic shading effect from a structural interference. The plurality of microphone capsules may be compactly nested to reduce a phase related error. The plurality of microphone capsules may comprise a first microphone capsule oriented in a first direction, a second microphone capsule oriented in a second direction, a third microphone capsule, and a fourth microphone capsule. The first direction may be substantially toward a first vertex of a notional tetrahedron and the second direction may be substantially toward to a second vertex of the notional tetrahedron. The third microphone capsule may be oriented in a third direction. The third direction may be substantially toward a third vertex of the notional tetrahedron. The fourth microphone capsule may be oriented in a fourth direction. The fourth direction may be substantially toward to a fourth vertex of the notional tetrahedron. The first microphone capsule may comprise a first capsule face that is arranged in a first orientation relative to the first direction; the second microphone capsule may comprise a second capsule face that is arranged in a second orientation relative to the second direction; the third microphone capsule may comprise a third capsule face that is arranged in a third orientation relative to the third direction; and the fourth microphone capsule may comprise a fourth capsule face that is arranged in a fourth orientation relative to the fourth direction. The first orientation, second orientation, third orientation, and/or fourth orientation may be at least one of the group consisting of substantially orthogonal or substantially parallel. The first microphone capsule may be disposed on a first face of the notional tetrahedron. The second microphone capsule may be disposed on a second face of the notional tetrahedron. The third microphone capsule may be disposed on a third face of the notional tetrahedron. The fourth microphone capsule may be disposed on a fourth face of the notional tetrahedron. The ambisonic microphone may comprise one or more processors and memory storing instructions that, when executed by the one or more processors, cause the microphone to encode a set of audio signals generated by the plurality of microphone capsules to at least one of an A-format audio standard, a B-format audio standard, a C-format audio standard, a D-format audio standard, or a G-format audio standard. The memory storing instructions that, when executed by the one or more processors, may cause the microphone to encode the set of audio signals using time-domain processing. The ambisonic microphone may comprise an output port to provide a set of audio signals formatted according to at least one of an A-format audio standard, a B-format audio standard, a C-format audio standard, a D-format audio standard, or a G-format audio standard to an external device. The ambisonic microphone may further comprise a mounting fixture configured to removably couple to at least one camera. The mounting fixture may be disposed above or beneath the plurality of microphone capsules.

An apparatus may comprise one or more processors and memory storing instructions that, when executed by the one or more processors, may cause the apparatus to receive, from an ambisonic microphone, a set of audio signals and encode the set of audio signals using time-domain processing. The apparatus may comprise a first microphone capsule disposed on a first face of the notional tetrahedron. The first microphone capsule may comprise a first microphone capsule face arranged in a first orientation relative to a first face of a notional tetrahedron. The apparatus may comprise a second microphone capsule disposed on a second face of the notional tetrahedron. The second microphone capsule may comprise a second microphone capsule face arranged in a second orientation relative to a second face of the notional tetrahedron. The apparatus may comprise a third microphone capsule disposed on a third face of the notional tetrahedron. The third microphone capsule may comprise a third microphone capsule face arranged in a third orientation relative to a third face of the notional tetrahedron. The apparatus may comprise a fourth microphone capsule disposed on a fourth face of the notional tetrahedron. The fourth microphone capsule may comprise a fourth microphone capsule face arranged in a fourth orientation relative to a fourth face of the notional tetrahedron. The first orientation, second orientation, third orientation, and/or fourth orientation may be at least one of the group consisting of substantially orthogonal or substantially parallel. The set of audio signals may be coded according to at least one of an A-format audio standard, a B-format audio standard, a C-format audio standard, a D-format audio standard, or a G-format audio standard. The apparatus may receive, from the ambisonic microphone, the set of audio signals via a wireless transmission. The memory storing instructions that, when executed by the at least one processor, may cause the apparatus to convert the set of audio signals to at least one of a B-format audio standard, a C-format audio standard, a D-format audio standard, or a G-format audio standard. The ambisonic microphone may comprise the one or more processors and memory. The apparatus may further comprise a mounting fixture configured to removably couple to at least one camera.

A method for capturing audio may comprise arranging a first microphone capsule at a first face of a notional tetrahedron and orienting a first face of the first microphone capsule substantially orthogonally to the first face of the notional tetrahedron. The method may further comprise: arranging a second microphone capsule at a second face of a notional tetrahedron and orienting a second face of the second microphone capsule substantially orthogonally to the second face of the notional tetrahedron and nesting the first microphone capsule with the second microphone capsule such that a first axis of minimum sensitivity of the first microphone capsule and a second axis of minimum sensitivity of the second microphone capsule intersect at a first coincident point. The method may further comprise encoding the first set of audio signals using time-domain processing and providing a second set of audio signals to an output device, wherein the second set of audio signals is encoded according to at least one of an A-format audio standard, a B-format audio standard, a C-format audio standard, a D-format audio standard, or a G-format audio standard. The method may further comprise obtaining a set of audio signals and wirelessly transmitting the set of audio signals to an output device. The set of audio signals may be encoded according to at least one of an A-format audio standard, a B-format audio standard, a C-format audio standard, a D-format audio standard, or a G-format audio standard.

In the foregoing specification, the present disclosure has been described with reference to specific exemplary examples thereof. Although the invention has been described in terms of a preferred example, those skilled in the art will recognize that various modifications, examples or variations of the invention can be practiced within the spirit and scope of the invention as set forth in the appended claims. The specification and drawings are, therefore, to be regarded in an illustrated rather than restrictive sense. Accordingly, it is not intended that the invention be limited except as may be necessary in view of the appended claims.

What is claimed is:

1. An ambisonic microphone, comprising:

a yoke comprising a protruding member defining an axis; and a plurality of microphone capsules coupled to the yoke along the protruding member, wherein:

the plurality of microphone capsules is geometrically arranged to reduce an acoustic shading effect from a structural interference introduced by adjacent ones of the plurality of microphone capsules; and the plurality of microphone capsules is compactly nested along the axis defined by the protruding member to reduce a phase-related error.

2. The ambisonic microphone of claim 1, wherein the plurality of microphone capsules comprises:

a first microphone capsule oriented in a first direction that is substantially toward a first vertex of a notional tetrahedron; and a second microphone capsule oriented in a second direction that is substantially toward a second vertex of the notional tetrahedron.

3. The ambisonic microphone of claim 2, further comprising:

a third microphone capsule oriented in a third direction that is substantially toward a third vertex of the notional tetrahedron; and a fourth microphone capsule oriented in a fourth direction that is substantially toward a fourth vertex of the notional tetrahedron.

4. The ambisonic microphone of claim 3, wherein:

the first microphone capsule comprises a first capsule face that is arranged in a first orientation relative to the first direction, the second microphone capsule comprises a second capsule face that is arranged in a second orientation relative to the second direction, the third microphone capsule comprises a third capsule face that is arranged in a third orientation relative to the third direction, the fourth microphone capsule comprises a fourth capsule face that is arranged in a fourth orientation relative to the fourth direction, and the first orientation, the second orientation, the third orientation, and the fourth orientation are each substantially orthogonal or substantially parallel.

5. The ambisonic microphone of claim 3, wherein:

the first microphone capsule comprises a first axis of minimum sensitivity, the second microphone capsule comprises a second axis of minimum sensitivity, the first axis and the second axis intersect at a first point in space, the third microphone capsule comprises a third axis of minimum sensitivity, the fourth microphone capsule comprises a fourth axis of minimum sensitivity, and the third axis and the fourth axis intersect at a second point in space.

6. The ambisonic microphone of claim 3, wherein:

the first microphone capsule is disposed on a first face of the notional tetrahedron, the second microphone capsule is disposed on a second face of the notional tetrahedron, the third microphone capsule is disposed on a third face of the notional tetrahedron, and the fourth microphone capsule is disposed on a fourth face of the notional tetrahedron.

7. The ambisonic microphone of claim 1 further comprising:

one or more processors; and memory storing instructions that, when executed by the one or more processors, cause the microphone to encode a set of audio signals generated by the plurality of microphone capsules to one or more of an A-format, a B-format, a C-format, a D-format, a G-format, or a binaural format.

8. The ambisonic microphone of claim 7, wherein the instructions, when executed by the one or more processors, cause the microphone to encode the set of audio signals using time-domain processing.

9. The ambisonic microphone of claim 1, further comprising:

an output port configured to provide a set of audio signals formatted according to one or more of an A-format, a B-format, a C-format, a D-format, a G-format, or a binaural format, to an external device.

10. The ambisonic microphone of claim 1, further comprising:

a mounting fixture configured to be removably coupled to at least one camera such that the mounting fixture is disposed beneath the plurality of microphone capsules.

11. The ambisonic microphone of claim 1, wherein:

a first pair of microphone capsules from among the plurality of microphone capsules comprise a first set of axes of minimum sensitivity that intersect at a first point in space, a second pair of microphone capsules from among the plurality of microphone capsules comprise a second set of axes of minimum sensitivity that intersect at a second point in space, and the first point in space is offset from the second point in space.

12. An ambisonic microphone, comprising:

a yoke comprising a protruding member defining an axis;

a first microphone capsule coupled to the yoke along the protruding member, the first microphone capsule being oriented in a first direction that is substantially toward a first vertex of a notional tetrahedron; and a second microphone capsule coupled to the yoke along the protruding member, the second microphone capsule being oriented in a second direction that is substantially toward a second vertex of the notional tetrahedron, wherein the first and second microphone capsules are compactly nested along the axis defined by the protruding member to reduce a phase-related error.

13. The ambisonic microphone of claim 12, further comprising:

a third microphone capsule oriented in a third direction that is substantially toward a third vertex of the notional tetrahedron; and a fourth microphone capsule oriented in a fourth direction that is substantially toward a fourth vertex of the notional tetrahedron.

14. The ambisonic microphone of claim 13, wherein:

the first microphone capsule is disposed on a first face of the notional tetrahedron, the second microphone capsule is disposed on a second face of the notional tetrahedron, the third microphone capsule is disposed on a third face of the notional tetrahedron, and the fourth microphone capsule is disposed on a fourth face of the notional tetrahedron.

15. The ambisonic microphone of claim 13, wherein:

the first microphone capsule comprises a first axis of minimum sensitivity, the second microphone capsule comprises a second axis of minimum sensitivity, the first axis and the second axis intersect at a first point in space, the third microphone capsule comprises a third axis of minimum sensitivity, the fourth microphone capsule comprises a fourth axis of minimum sensitivity, and the third axis and the fourth axis intersect at a second point in space.

16. The ambisonic microphone of claim 13, wherein:

the first microphone capsule comprises a first capsule face that is arranged in a first orientation relative to the first direction, the second microphone capsule comprises a second capsule face that is arranged in a second orientation relative to the second direction, the third microphone capsule comprises a third capsule face that is arranged in a third orientation relative to the third direction, the fourth microphone capsule comprises a fourth capsule face that is arranged in a fourth orientation relative to the fourth direction, and the first orientation, the second orientation, the third orientation, and the fourth orientation are each substantially orthogonal or substantially parallel.

17. The ambisonic microphone of claim 13, further comprising:

one or more processors; and memory storing instructions that, when executed by the one or more processors, cause the ambisonic microphone to encode a set of audio signals generated by the first microphone capsule, the second microphone capsule, the third microphone capsule, and the fourth microphone capsule to one or more of an A-format, a B-format, a C-format, a D-format, a G-format, or a binaural format.

18. The ambisonic microphone of claim 17, further comprising:

an output port configured to provide the set of audio signals to an external device.

19. The ambisonic microphone of claim 12, further comprising:

a mounting fixture configured to be removably coupled to at least one camera such that the mounting fixture is disposed beneath the first microphone capsule and the second microphone capsule.

20. The ambisonic microphone of claim 12, wherein the first microphone capsule is oriented in the first direction within a range of 20 degrees towards the first vertex of the notional tetrahedron, and wherein the second microphone capsule is oriented in the second direction within a range of 20 degrees towards the second vertex of the notional tetrahedron.

* * * * *